(12) United States Patent
Dothan (10) Patent No.: US 10,498,617 B1
(45) Date of Patent: Dec. 3, 2019

(54) SYSTEM, METHOD, AND COMPUTER PROGRAM FOR HIGHLY AVAILABLE AND SCALABLE APPLICATION MONITORING

(71) Applicant: Amdocs Development Limited, Limassol (CY)

(72) Inventor: Nir Dothan, Raanana (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 283 days.

(21) Appl. No.: 15/365,824

(22) Filed: Nov. 30, 2016

(51) Int. Cl.
  *H04L 12/26* (2006.01)
  *H04L 29/12* (2006.01)
  (Continued)

(52) U.S. Cl.
  CPC ............ *H04L 43/08* (2013.01); *H04L 43/065* (2013.01); *H04L 43/103* (2013.01);
  (Continued)

(58) Field of Classification Search
  CPC ... H04L 41/069; H04L 41/0695; H04L 41/20; H04L 43/08; H04L 43/16; H04L 21/50;
  (Continued)

(56) References Cited

U.S. PATENT DOCUMENTS 6,185,306 B1 * 2/2001 Mages ..................... G06F 21/10
   375/E7.025
7,702,779 B1   4/2010 Gupta et al.
(Continued)

FOREIGN PATENT DOCUMENTS

CN    102170474 A   8/2011

OTHER PUBLICATIONS

Andreolini et al., "A Scalable Architecture for Real-Time Monitoring of Large Information Systems," 2012 Second Symposium on Network Cloud Computing and Applications, 2012, pp. 143-150.
(Continued)

*Primary Examiner* — Patrice L Winder
*Assistant Examiner* — Aye M Aung
(74) *Attorney, Agent, or Firm* — Zilka-Kotab, P.C.

(57) ABSTRACT

A system, method, and computer program product are provided for highly available and scalable application monitoring. In operation, a monitoring system receives a plurality of metrics from a plurality of reporting agents associated with a system being monitored. The system being monitored includes a plurality of heterogeneous components each being associated with at least one of the plurality of reporting agents, and the monitoring system is configured to monitor the system being monitored for overall system health utilizing the plurality of metrics. Further, the monitoring system determines to dispatch one or more alerts, metrics and aggregated metrics, to one or more downstream systems based on one or more of the plurality of metrics. Additionally, the monitoring system dispatches the one or more alerts to the one or more downstream systems utilizing one or more points of access to a plurality of downstream systems including the one or more downstream systems. The monitoring system enables the plurality of reporting agents to each automatically connect to one of a plurality of collector servers for communicating the plurality of metrics. In addition, the monitoring system enables additional reporting agents to be automatically added to the monitoring system and enables the plurality of reporting agents each to automatically reconnect to another one of the plurality of collector servers upon failure of the one of the plurality of collector servers.

14 Claims, 5 Drawing Sheets

(51) Int. Cl.
*H04L 29/08* (2006.01)
*H04L 12/803* (2013.01)

(52) U.S. Cl.
CPC ........ *H04L 47/125* (2013.01); *H04L 61/1511* (2013.01); *H04L 67/26* (2013.01)

(58) Field of Classification Search
CPC ... H04L 61/1511; H04L 67/26; H04L 43/065; H04L 47/125; H04L 43/103
USPC .......................................................... 709/224
See application file for complete search history.

(56) References Cited

U.S. PATENT DOCUMENTS

| | | | | |
|---|---|---|---|---|
| 7,770,102 | B1* | 8/2010 | Wolff | G06Q 30/02 715/234 |
| 8,560,695 | B2* | 10/2013 | Degaonkar | G06F 11/2025 370/468 |
| 9,319,282 | B2* | 4/2016 | Keane | H04L 41/5012 |
| 2004/0064570 | A1* | 4/2004 | Tock | H04L 67/325 709/228 |
| 2004/0111471 | A1* | 6/2004 | Stoner | H04L 41/0681 709/204 |
| 2006/0143293 | A1* | 6/2006 | Freedman | H04L 45/02 709/225 |
| 2007/0266045 | A1* | 11/2007 | Bansal | H04L 67/22 |
| 2008/0005321 | A1* | 1/2008 | Ma | H04L 41/0893 709/224 |
| 2011/0098973 | A1* | 4/2011 | Seidman | G06F 11/0709 702/179 |
| 2011/0246826 | A1* | 10/2011 | Hsieh | G06F 11/3476 714/20 |
| 2012/0317274 | A1 | 12/2012 | Richter et al. | |
| 2015/0106683 | A1* | 4/2015 | Lindsey | G06F 16/148 715/202 |
| 2015/0195157 | A1* | 7/2015 | Nayyar | H04L 43/0852 709/224 |
| 2016/0277257 | A1* | 9/2016 | Addleman | G06F 11/3466 |
| 2016/0323377 | A1* | 11/2016 | Einkauf | H04L 67/1076 |

OTHER PUBLICATIONS

Apache Hadoop, "ZooKeeper Recipes and Solutions," The Apache Software Foundation, last published Jul. 20, 2016, pp. 1-7, https://cwiki.apache.org/confluence/display/ZOOKEEPER/ZKClientBindings.

Colmer, P.,"In Memory Data Grid Technologies," High Scalability, Dec. 21, 2011, pp. 1-13.

Wikipedia, "Shared nothing architecture," Wikipedia, last modified Oct. 18, 2016, pp. 1-3, https://en.wikipedia.org/wiki/Shared_nothing_architecture.

Reed, B., "ZooKeeper Client Bindings," Apache ZooKeeper, last modified Sep. 25, 2013, pp. 1, https://cwiki.apache.org/confluence/display/ZOOKEEPER/ZKClientBindings.

Calero, et al., "MonPaaS: An Adaptive Monitoring Platform as a Service for Cloud Computing Infrastructures and Services," IEEE Transactions on Services Computing, vol. 8, No. 1, 2015, pp. 65-78.

Metrics, "Metrics is a Java library which gives you unparalleled insight into what your code does in production," Yammer Inc., Nov. 15, 2016, pp. 1, as retrieved by the Internet Archive Wayback Machine, https://web.archive.org/web/20161115173352/http://metrics.dropwizard.io/3.1.0/.

Apache Hadoop, "ZooKeeper Recipes and Solutions," Apache Software Foundation, last published Jul. 20, 2016, pp. 1-7, http://zookeeper.apache.org/doc/trunk/recipes.html#sc_leaderElection.

* cited by examiner

SYSTEM, METHOD, AND COMPUTER PROGRAM FOR HIGHLY AVAILABLE AND SCALABLE APPLICATION MONITORING

FIELD OF THE INVENTION

The present invention relates to monitoring systems, and more particularly to monitoring systems that are highly available and scalable.

BACKGROUND

As enterprise applications become more complex, grow in deployment architectures, and run on elastic and diversified cloud platforms, there is a growing need for sustainable health and performance monitoring of those systems.

Many current monitoring systems are not sufficiently highly-available and do not scale well enough to support the growing needs of companies. One reason is that, in the past, monitoring systems were not considered critical because a monitored system could work even if the monitoring system was down. Monitoring systems are now becoming a crucial component of the monitored system. Monitoring systems interact with other infrastructure systems and if the monitoring system is down, or fails to respond to a load, then the monitored system is not able to automatically scale out/in, automatically resolve issues, and optimize its behavior.

Some existing monitoring systems achieve high availability by replicating databases. This approach often adds complexity and extra load on the monitored system. In addition, replicating databases makes the monitoring system even harder to scale in order to handle larger amounts of monitored entities.

There is thus a need for addressing these and/or other issues associated with the prior art.

SUMMARY

A system, method, and computer program product are provided for highly available and scalable application monitoring. In operation, a monitoring system receives a plurality of metrics from a plurality of reporting agents associated with a system being monitored. The system being monitored includes a plurality of heterogeneous components each being associated with at least one of the plurality of reporting agents, and the monitoring system is configured to monitor the system being monitored for overall system health utilizing the plurality of metrics. Further, the monitoring system determines to dispatch one or more alerts, metrics and aggregated metrics, to one or more downstream systems based on one or more of the plurality of metrics. Additionally, the monitoring system dispatches the one or more alerts to the one or more downstream systems utilizing one or more points of access to a plurality of downstream systems including the one or more downstream systems. The monitoring system enables the plurality of reporting agents to each automatically connect to one of a plurality of collector servers for communicating the plurality of metrics. In addition, the monitoring system enables additional reporting agents to be automatically added to the monitoring system and enables the plurality of reporting agents each to automatically reconnect to another one of the plurality of collector servers upon failure of the one of the plurality of collector servers.

DETAILED DESCRIPTION

Figure 1:
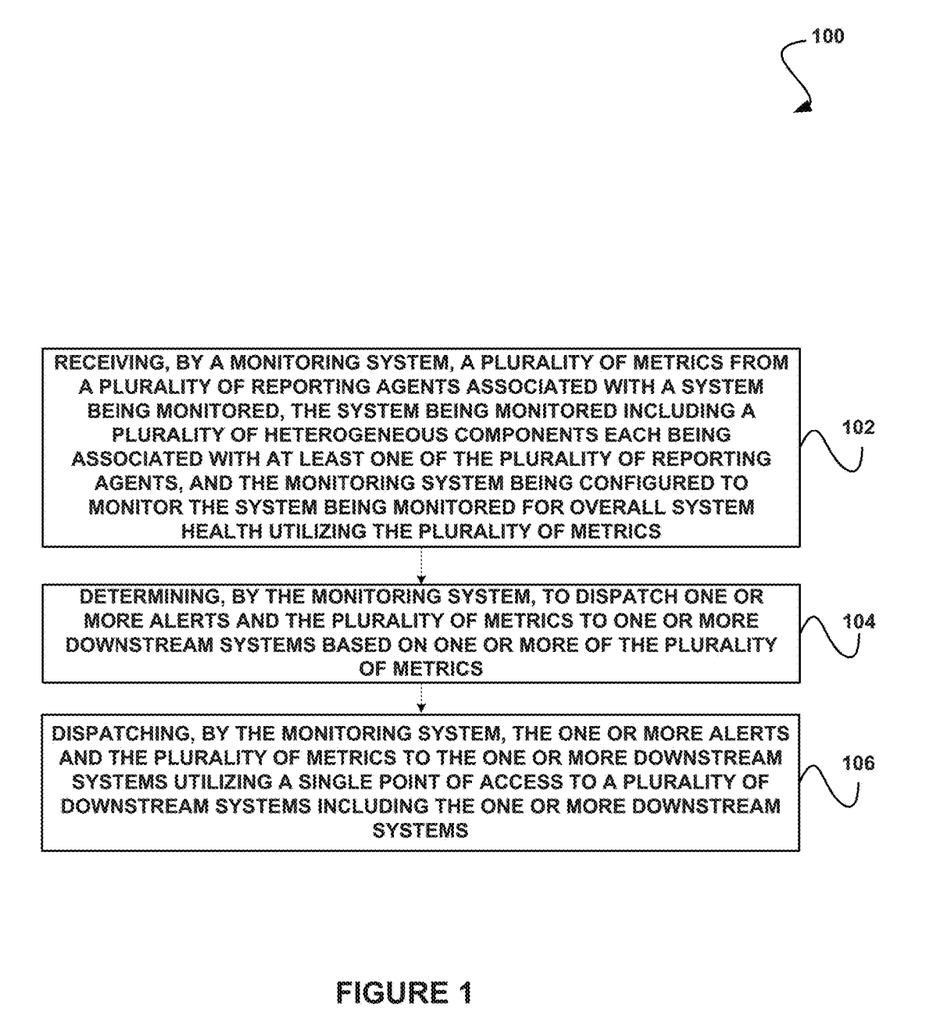
FIG. 1 illustrates a method for highly available and scalable application monitoring, in accordance with one embodiment.

FIG. 1 illustrates a method 100 for highly available and scalable application monitoring, in accordance with one embodiment.

In operation, a monitoring system receives a plurality of metrics from a plurality of reporting agents associated with a system being monitored. See operation 102. The system being monitored includes a plurality of heterogeneous components each being associated with at least one of the reporting agents, and the monitoring system is configured to monitor the system being monitored for overall system health utilizing the plurality of metrics.

Further, the monitoring system determines to dispatch one or more alerts and the plurality of metrics to one or more downstream systems based on one or more of the plurality of metrics. See operation 104.

The monitoring system may dispatch metric samples (data points) to the downstream systems. Both alerts and metrics may be pushed downstream. In one embodiment, a single point of access may be utilized when the downstream systems are not pushed the data but when they initiate metric queries to the monitoring system (i.e. pull mode).

Additionally, the monitoring system dispatches the one or more alerts and one or more of the plurality of metrics to the one or more downstream systems utilizing one or more points of access to a plurality of downstream systems including the one or more downstream systems. See operation 106.

The monitoring system enables the plurality of reporting agents to each automatically connect to one of a plurality of collector servers for communicating the plurality of metrics (e.g. without requiring the reporting agents to be configured, etc.). In addition, the monitoring system enables additional reporting agents to be automatically added to the monitoring system and enables the plurality of reporting agents each to automatically reconnect to another one of the plurality of collector servers upon failure of the one of the plurality of collector servers. In one embodiment, the monitoring system may enable the reporting agents to each automatically connect (or reconnect) to one of the collector servers by utilizing a pre-configured server address name array including Domain Name Servers (DNS) names of collector servers in the network, or by utilizing any other form of Service Discovery embodiment or a well-known bootstrapping server.

The monitoring system may also load-balance the work performed by the collector servers. For example, the monitoring system may direct each of the reporting agents to automatically connect to the collector servers such that a work load is equally balanced between the collector servers.

Additionally, the monitoring system may detect that instances associated with the collector servers have been added or removed. In this case, responsibilities of the collector servers for the reporting agents may be dynamically recalculated based on the detection of the instances associated with the collector servers being added or removed.

Moreover, the monitoring system enables additional collector servers to be added to the monitoring system. This allows the monitoring system to be versatile and scalable in the case more reporting agents are added/removed, etc.

It should be noted that the method 100 may be implemented utilizing various systems, hardware, software, applications, user interfaces, etc., as dictated by the implementer. For example, the monitoring system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
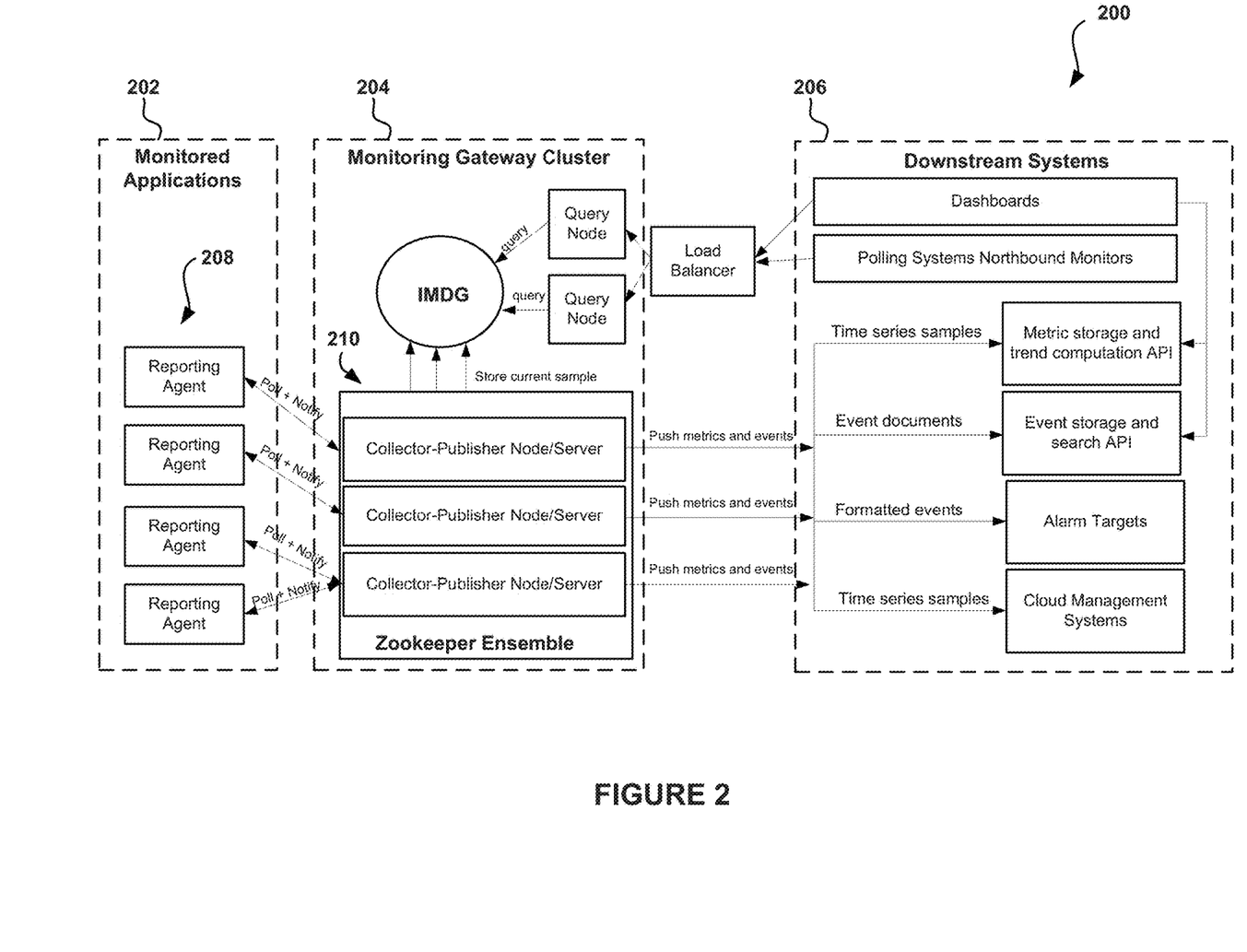
FIG. 2 shows a monitoring system for highly available and scalable application monitoring, in accordance with one embodiment.

FIG. 2 shows a monitoring system 200 for highly available and scalable application monitoring, in accordance with one embodiment. As an option, the monitoring system 200 may be implemented in the context of the details of the previous figure and/or any subsequent figure(s). Of course, however, the monitoring system 200 may be implemented in the context of any desired environment. Further, the aforementioned definitions may equally apply to the description below.

The monitoring system 200 is in charge of checking the state of an overall system in terms of load, health, etc. Generally speaking, the monitoring system 200 maintains metrics and component information that enables it compute a "health state", and dispatches alarms to external subscribers, whenever abnormal behavior is detected, and/or feed downstream systems with ongoing feeds of metrics and aggregated metric data points regardless of abnormal behavior detection.

The monitoring system 200 may interact with and alarm human operators, but also interact with: cloud management systems to drive application scaling decisions; process automation systems to automatically resolve issues; and analytics to learn the trends of applications in order to optimize them.

Those needs require enhanced resiliency of monitoring applications to allow scalability and remain available at all times, as down time is not an option. The monitoring system 200 represents the architecture of a highly available and scalable monitoring system.

As shown, in one embodiment, the monitoring system 200 may include three tiers: 1) a monitored applications tier 202 (including reporting agents 208 and also referred to herein as the monitored system); 2) a collection and aggregation tier 204 (including collector servers 210); and 3) a data consuming tier 206 (also referred to herein as downstream systems).

The monitored applications tier 202 includes applications that are being monitored (i.e. the monitored system) and dedicated monitoring agents 208 that are embedded in the applications. The purpose of the reporting agents 208 is to expose and report a health state and performance data to the collection and aggregation tier 204.

The collection and aggregation tier 204 includes a Monitoring Gateway Cluster. The purpose of the Monitoring Gateway Cluster is to collect all monitoring metrics and events from the reporting agents 208 and may expose monitoring information to downstream systems through a single point of access.

The single point of access is relevant when downstream systems pull metrics from the Monitoring Gateway Cluster. When metrics are pushed downstream, each server pushes metrics originating from the agents for which it is responsible. Hence, there are multiple points of access used. This enables scalability by eliminating a single point bottleneck. The Monitoring Gateway Cluster also performs metric aggregations and includes a rule management sub system that enables flexible definitions of rules to trigger alarms.

The data consuming tier 206 includes downstream systems that consume monitoring data for different purposes, including the storage of data, analytics, alarming users, and automatic actions such as scaling in the cloud.

The collection and aggregation tier 204 employs a novel approach to retrieving the health state data and to make such date available for the data consuming tier 206. This new approach is handled by the Collector-Publisher Nodes (i.e. the collector servers 210) and Query Nodes, which may, in one embodiment, use Apache Zookeeper as a utility to manage shared configuration in a distributed environment. However, any other shared configuration management tools can be used without reducing the applicability of the proposed solution specifications and capabilities.

The monitored applications are deployed on various hosts that share a network with the Monitoring Gateway Cluster. A dedicated library is used by each of the reporting agents 208 to instrument its activities, according to a specific implementation, chosen per application, exposing relevant metrics.

Instrumentation statistics are maintained in the reporting agent's 208 virtual memory in the form of metrics, and an interface to query them is exposed over a certain port in the hosting machine. The communication channel, established by the Monitoring Gateway Cluster to the reporting agent 208, over the port above is termed the gateway channel.

In addition to being polled for metrics, the reporting agent 208 is also able to push notification messages over the same communication channel. Notifications are typically pushed by applications when they identify an erroneous situation that requires immediate action. Such notifications are also referred to as events herein.

A special case of a reporting agent 208 is the Rule Manager Application. In one embodiment, the Rule Manager Application may periodically poll pre-configured trends from a Metric Storage and Trends Computation API, test those trends against pre-configured thresholds, and if thresholds are crossed, push events with relevant content.

One of the innovations of the monitoring system 200 is the use of an additional communication channel, by the reporting agent 208, dedicated to session management with the Monitoring Gateway Cluster. In one embodiment, the session management may utilize a framework such as Zookeeper, where the agent embodies a Zookeeper Binding.

The reporting agent 208 initiates a session in this communication channel with one of the collector servers 210, which resided in the Monitoring Gateway Cluster, essentially embedded in (or part of, etc.) the Collector-Publisher Nodes.

The reporting agent 208 knows an array of n (where n is an odd integer that is equal or greater than 3) target server hosts/ports. Well defined service names are used for host configurations, of which their IP addresses can be resolved using a DNS resolution or any other type of service discovery platform of a well-known bootstrapping address. Additionally, a well-defined port number may be used, in order to avoid the need to hardcode IP addresses and ports in the reporting agents' 208 configuration files. It should be noted that the monitoring system 200 relies on a quorum based distribution and features a hierarchical configuration system (used to build modern Service Discovery systems).

The reporting agent 208 attempts to establish a connection with an arbitrary server from the configured server address array. Upon failure to connect, the client re-attempts to connect to a different address from the server address array. The reporting agent 208 subscribes to events (called watch events), which are emitted by the cluster whenever sessions are disconnected or become stale. The application attempts to reestablish the session in such cases, and if a certain attempted server 210 is unresponsive, another server 210 from the cluster is attempted.

Upon successful session establishment, the reporting agent 208 creates an ephemeral data object in the shared configuration (e.g. an ephemeral node in the Zookeeper cluster shared memory when Zookeeper is used, etc.) and stores a data object containing the host and port where it can be reached. This information should be available to all reporting agents 208 and facilitate service discovery of the reporting agents 208 by the Collector-Publisher Nodes, when they need to poll reporting agents' metrics.

The monitoring system 200 has benefits regarding high availability and scalability. The Monitoring Gateway Cluster provides a proxy and a single entry point into an otherwise highly distributed and complex environment, hosting many machines and monitored processes, which are otherwise harder to discover by an external system wishing to make use of the metrics maintained by the system and subscribeable events that are dispatched by the system.

In essence, the Monitoring Gateway Cluster flattens the underlying environment for its clients and facilitates clients' monitoring needs on their behalf. In addition, the Monitoring Gateway Cluster provides added value services that are built on top of raw metrics and events that are collected from the monitored applications including multiple metric aggregations into higher level metrics, and a Rule Engine to configure flexible conditions for generation of events, which may take any entity from any data source in the monitored system 200 to use for its calculations.

All services provided by the Monitoring Gateway Cluster are scalable in the form of additional nodes (e.g. collector servers 210, etc.) that can be added to split the load, and are highly available in a manner that, in case a node fails, there is always another node that will provide the service instead.

Controller-Publisher nodes (also referred to herein as collector servers 210) are a cluster of n processes, where n is an odd integer, for quorum purposes, in order to avoid "split brain", and is equal or greater than 3, each one running on a separate machine, and sharing a common network with each other as well as with reporting agents 208.

The core roles of each Controller-Publisher node include periodically collecting metrics from reporting agents 208 under its responsibility. The Controller-Publisher nodes also post each batch of collected metrics (following preconfigured filtration) to downstream systems. This includes updating the batch of metrics and values in a highly available manner, and in one embodiment, may be distributed utilizing an In Memory Data Grid (IMDG) (e.g. such as Gemfire or Couchbase, etc.). The Controller-Publisher nodes may also post to the Metric Storage system that maintains a time series optimized storage and exposes a query API allowing statistical functions and data manipulations (e.g. such as Graphite, InfluxDB and OpenTS DB, etc.). The Controller-Publisher nodes may also post to Cloud Management Monitoring Systems such as Openstack Ceilometer and Amazon AWS Cloud Watch, etc.

The Controller-Publisher nodes listen to incoming events pushed by the reporting agents 208 under their responsibility. The Controller-Publisher nodes also post and dispatch events to subscribed downstream systems, such as event storage systems in the form of a document based storage and a search APIs (e.g. Elasticsearch, etc.), and alarm targets including SNMP traps, webhooks, email, etc.

In addition to their core roles, Collector-Publisher Nodes have management roles. In one embodiment, with Zookeeper, each Collector-Publisher Node process may embed a Zookeeper server instance. Together, the cluster of Collector-Publisher Nodes constitutes a replicated Zookeeper Ensemble that maintains quorum and is highly available.

Each Collector-Publisher Node is notified by the cluster when a reporting agent 208 connects to the cluster or disconnects from the cluster. Each Collector-Publisher Node is also notified by the cluster when any other Collector-Publisher Node connects to the cluster or disconnects from the cluster, such that each node knows when other nodes are up and down.

Collector-Publisher Nodes also have full access to shared data (e.g. stored in Zookeeper memory, in one embodiment, etc.), hence the details of all agents and nodes are available to them.

Using the watch events and the shared configuration data that is maintained in memory, Collector-Publisher Nodes may perform the following management activities: 1) welcome newly connected reporting agents 208 and handle their service registration into the cluster's shared configuration; 2) take responsibility over newly connected reporting agents 208 if corresponding responsibility definitions apply; 3) react to connections and disconnections of peer Collector-Publisher Nodes, changing responsibilities accordingly; and 4) cleaning up after disconnected reporting agents 208 after they disconnect.

Query Nodes are stateless API servers running on multiple hosts. In one embodiment, they may all be connected to the cluster's IMDG and expose an API for external systems to query metrics. The external clients that may use Query Nodes include the monitoring system's dashboard application as well as external monitoring systems and polling applications.

When a query API is invoked, the Query Node looks up the requested metrics in the IMDG and reruns the result to the caller. The Query Nodes may hide the internals of the IMDG and expose a consistent interface to the outside work, in a manner that enables replacement of IMDG functionality without impacting the interfaces to external systems.

In one embodiment, a Load Balancer may be deployed in front of the Query Nodes. The Load Balancer may constantly run health checks of its pool members and only proxy requests to healthy Query Nodes, which it may serve in a round robin fashion.

With respect to high availability and failover flows associated with the monitoring system 200, and more particularly to responsibility management, responsibility management pertains to the activities carried out by Collector-Publisher Nodes to allocate reporting agents 208 for which they will assume responsibility. Responsibility for of a Collector-Publisher Node instance over a group of reporting agents 208 means that it is this and only this node's responsibility to collect metrics from the reporting agents 208 of this group, to listen to events publishes by this group of agents, and to handle metric and event publishing on behalf of those agents to downstream systems.

Responsibility management assures that on one hand, there will be no duplicate data published by multiple nodes and no overload of nodes querying reporting agents 208 more than required, while on the other hand it assures that no reporting agents 208 are ignored. Responsibility management makes a reasonable effort to split the load evenly among Collector-Publisher Nodes.

The underlying method of responsibility management includes, when reporting agents 208 register, the sequential node is assigned a numeric sequence number. The sequence is incremented by one with every new reporting agent registration, where S is the sequence number assigned a certain reporting agent 208 after establishing a session.

The number of connected Collector-Publisher Nodes is known at all times thanks to shared configuration data. "N", the number of responsibility groups, is defined to be equal to the current number of Collector-Publisher Nodes in the cluster, so that each Collector-Publisher Node is assigned with one group.

Since all Collector-Publisher Nodes too are sequential, they are also assigned with a sequence number. The method for each Collector-Publisher Node to determine the number of its responsibility group is to iterate the list of Collector-Publisher nodes and find its own position in that list, such that the first one is 0, then next is 1, and so on. In this case, "G" indicates a certain Collector-Publisher Node's responsibility group.

Once a node's responsibility group number is known, it needs to create an in memory list of the reporting agents 208 that make its responsibility group. This list is updated each time a reporting agent 208 connects or disconnects and is rebuilt when a Collector-Publisher Node disconnects (in cases of graceful shutdown or failure). In order to build this list, the node iterates the reporting agents' nodes in Zookeeper and selects the nodes that test positive for S MODULUS N equals to G (or S%N==G in computer programming notation).

With respect to failover scenarios and Collector-Publisher Node failure, in the case a certain Collector-Publisher Node in the cluster fails or disconnects from the cluster, a watch event gets published by the shared configuration framework. All Collector Publisher Nodes in remaining cluster receive this event and the responsibility management function is triggered for each. The function will now use a smaller number of nodes (N) and responsibilities.

It should be noted that the previously collected metrics are still in the IMDG, hence no disruption is felt by Query Nodes. For the reporting agents 208, if a persistent communication channel is used, then they will experience a disconnection followed by immediate reconnection of possibly a different node.

With respect to a Query Node failure, Query-Nodes have no responsibilities and are completely stateless. If a certain Query Node fails, the Load Balancer health check will discontinue to proxy requests to the failed node and use only healthy nodes, until the failed node recovers.

Scalability of Collector-Publisher Nodes is achieved through split responsibility. In order to accommodate to a growing number of reporting agents 208, additional Collector-Publisher Nodes can be added to the cluster, since they share nothing but shared configuration, there are no dependencies and locks to prevent linear horizontal scalability.

When sizing the deployment, the number of Collector-Publisher nodes in the cluster should consider the load that would be caused by 1 or 2 nodes' failure and also a certain degree of an unbalanced responsibility distribution that may occur as monitored applications are typically uneven with the volume of metrics they report.

As the number of reporting agents 208 and the number of metrics that they report increases, IMDG nodes may be added to accommodate. It should be noted that the amount of data cached per metric is minimal, with only the last sample in store, reflecting the most current reading.

Scalability of Query Nodes is achieved by adding additional nodes as needed to address the volume of queries that are performed by query clients.

The monitoring system 200 is a monitoring system that can accept any number of reporting agents 208 using a simple array of end-points. The monitoring system 200 will redirect the agent to the proper server (least loaded server). Further, zero configurations are required for the monitoring agents 208. Additionally, no coordination is required to split the work, with a master-less distribution of responsibilities between monitoring servers.

The monitoring system 200 offers a plug and play architecture where adding another server 210 will not impact the other servers. The monitoring system 200 (client and servers) will automatically reallocate the task responsibilities and manage more load. The monitoring system 200 load-balances the query side efficiently.

The monitoring system 200 is designed in a way that it can work with an IMDG as a central database to ensure high availability and high performance for replication.

Traditional Monitoring Tools that are based on polling of remote agents (as opposed to systems that push metrics to a central management system) typically require specific configuration of the polling system in order to discover the polled agents. When agents are added, removed or moved to a different IP, the polling system needs to be reconfigured, often requiring manual work and bouncing the system.

In the monitoring system 200, as soon as a new monitored application is launched, it publishes its connection details to a collector server in a well-known DNS address or service name, which makes it automatically discoverable by the monitoring system 200. No configuration at all is required. The same applies for agents that are removed or relocated (or even simply restarted), as soon as they boot, they register with the monitoring system 200, updating its shared configuration. This makes the monitoring system 200 cloud compliant, as it automatically adapts to elastic cloud environments without human intervention or disruption of the monitoring service.

In one embodiment, the monitoring system 200 may utilize Apache Zookeeper as a foundation for in-memory shared configuration and agent connect/disconnect notifications.

The monitoring system 200 splits the workload among available Collector-Publisher instances/servers dynamically by recalculating responsibilities whenever instances are added or removed, and updates responsibilities as reporting agents 208 connect/disconnect. Dynamic, well balanced, responsibility management contributes to both high availability as well as scalability. In one embodiment, the responsibility management algorithm can be an enhancement of the Zookeeper Leader Election recipe to split the population into separate groups and assign a different leader to each. The number of groups and leaders is dynamically determined by the number of Collector-Publisher instances available.

In most other monitoring systems, if responsibilities are split, they are typically preconfigured and do not update dynamically to accommodate available servers without human intervention.

Traditional monitoring tools usually rely on persistent databases to have metrics available for query. The availability of the query API and alarming service typically depends on the availability of the database. In order to overcome database unavailability, database replication is often implemented. Replicating databases is complex and, with lack of sharding, scalability is limited. The addition of database nodes and maintenance of existing nodes is not straightforward. As a consequence, response time increases dramatically, when working at scale.

In monitoring system 200, publishing of metric samples and alarms to downstream systems has no dependency on any metrics storage, it is done "in-flight" as metrics are collected and alarms are pushed into the system. If the monitoring system 200 is implemented based on Zookeeper, as one embodiment, then the configuration data is hosted in the Zookeeper in-memory shared configuration replicated area and is therefore quickly accessible and highly available, relying on Zookeeper's built in replication capability.

Querying of metrics from the monitoring system 200 may be backed by an In Memory Data Grid, which provides: linear horizontal scalability; RAM level performance, supporting low latency queries; high availability of the data store; and uninterrupted maintenance of IMDG nodes.

Traditional monitoring tools usually share monitored entities such as agents, metrics and alarms in common data sources. As agents, metrics, polling clients and downstream distribution targets are added, load and contention increases in common resources.

The monitoring system 200 architecture is based on a "Shared Nothing" architecture principle, through the use of the responsibility management principle together with IMDG, which also shares nothing. By sharing nothing, the monitoring system 200 is able to scale horizontally without increasing contention.

Figure 3:
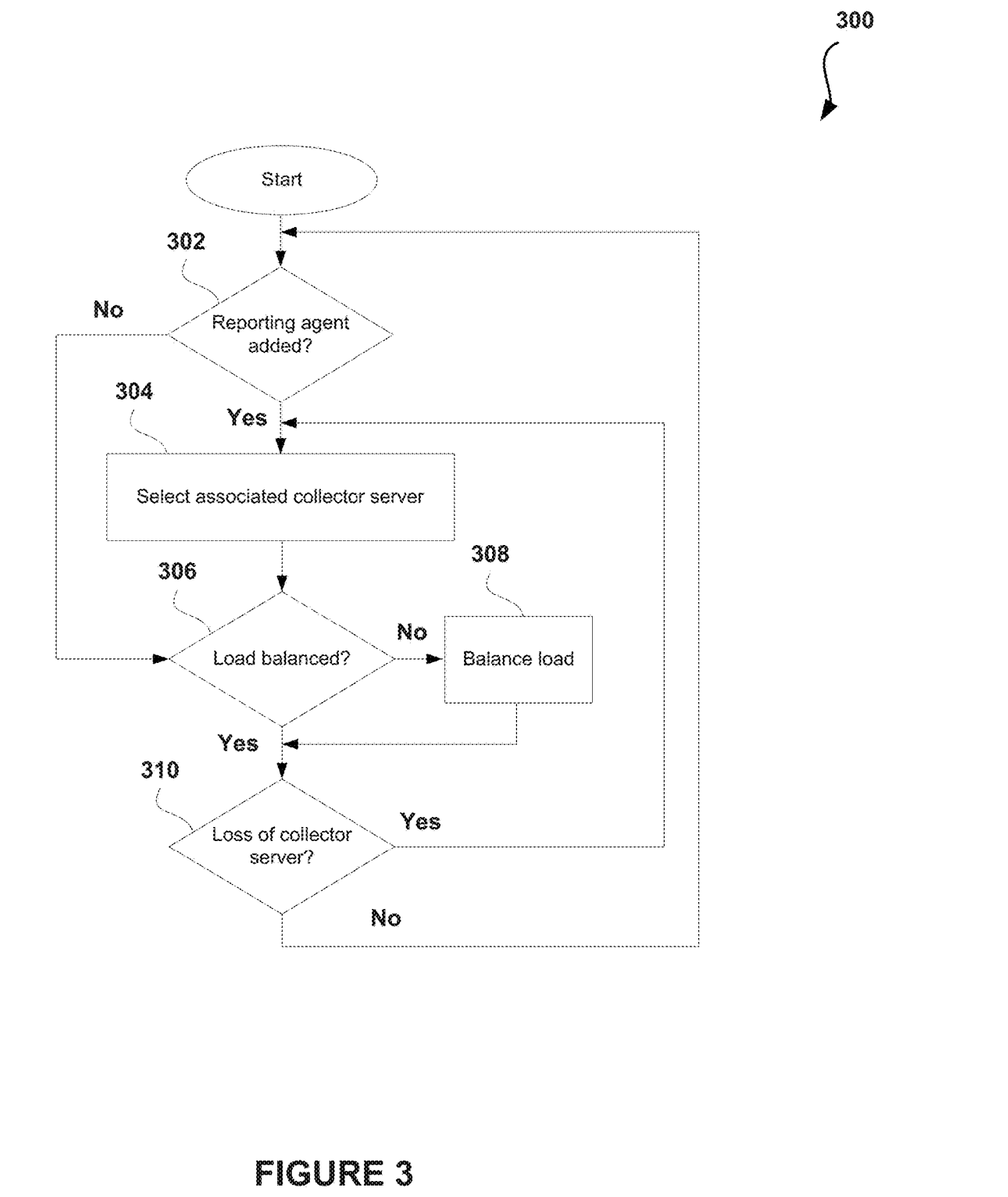
FIG. 3 shows a simplified system flow diagram for addition of reporting agents and/or loss of collector servers, in accordance with one embodiment.

FIG. 3 shows a simplified system flow diagram 300 for addition of reporting agents and/or loss of collector servers, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, the monitoring system determines whether a reporting agent is added (e.g. along with an application to monitor, etc.). See decision 302. If a reporting agent is added, the monitoring system selects a collector server to perform the monitoring, etc., (e.g. as described in the context of FIG. 2, etc.). See operation 304.

Further, the monitoring system determines whether the reporting agents are properly distributed among the collector servers. See decision 306. If the work is not equally distributed, the monitoring system performs load balancing. See operation 308. Also, if a collector server fails or is interrupted, the monitoring system identifies this and another collector server is automatically selected to address the work of the lost server. See decision 310.

Figure 4:
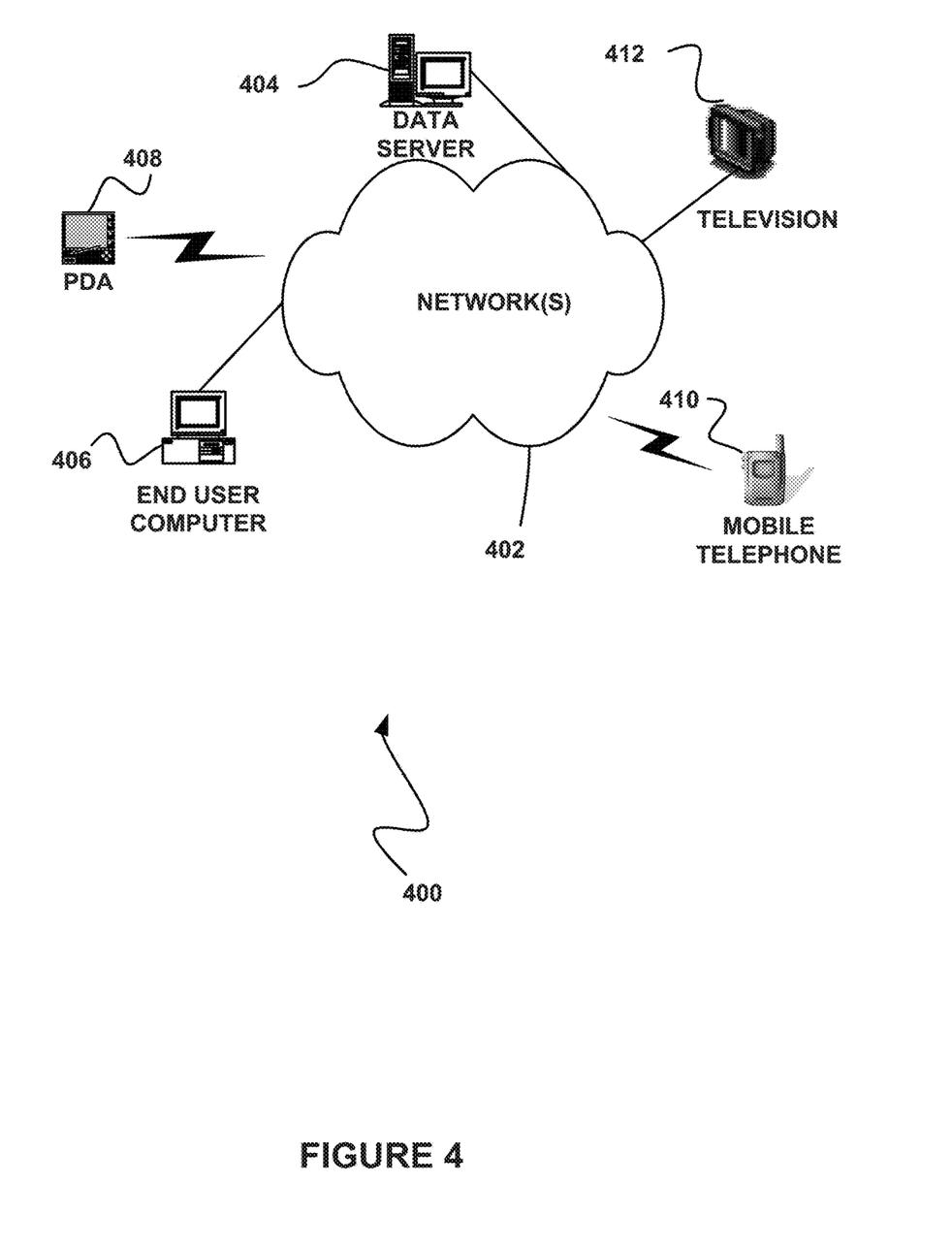
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
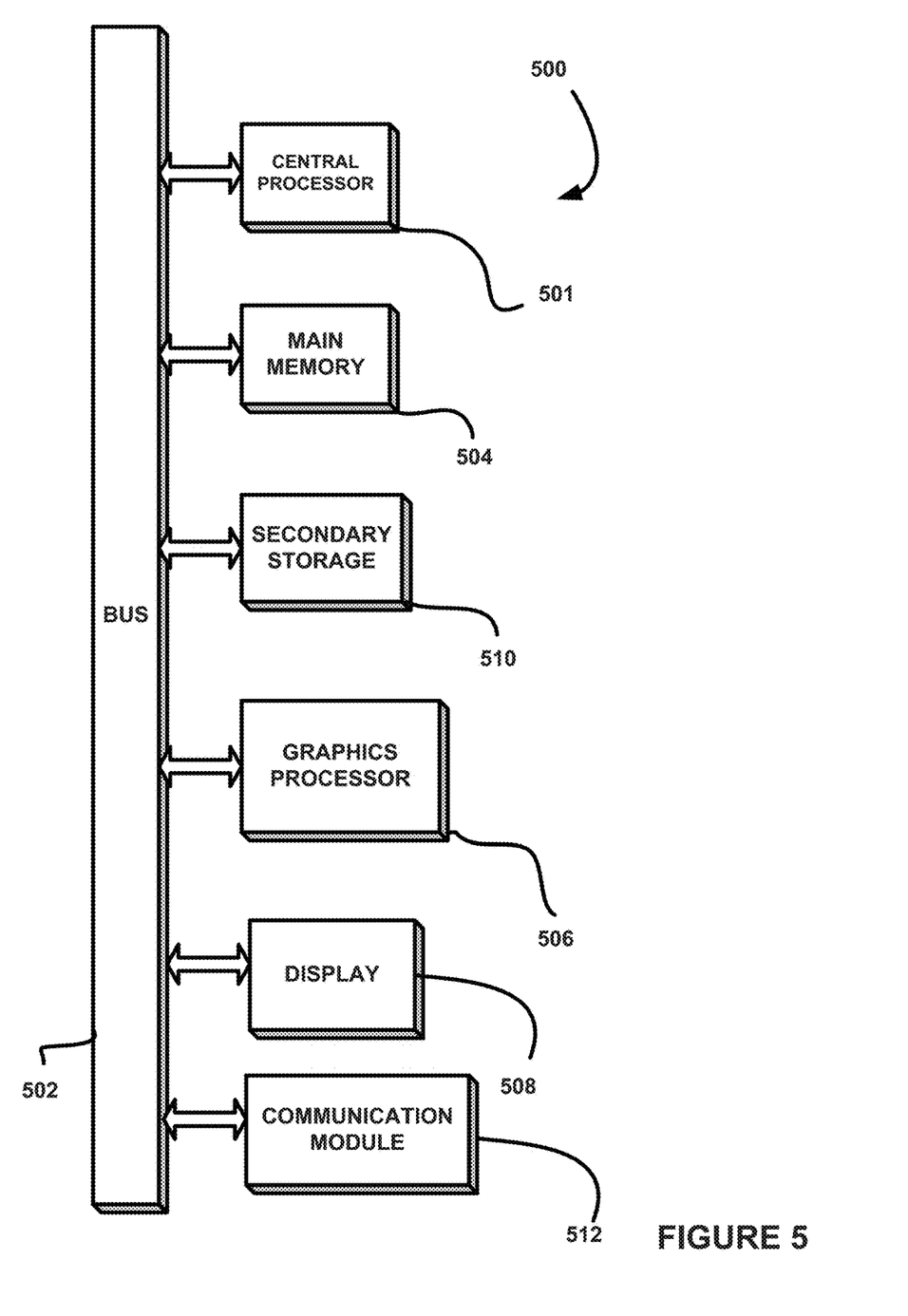
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   assigning, by a monitoring system having a plurality of collectors servers, each reporting agent of a plurality of reporting agents to a corresponding collector server of the plurality of collector servers, wherein each reporting agent of the plurality of reporting agents is embedded in a corresponding one of a plurality of applications of an application system being monitored for overall system health and performance, wherein assigning each reporting agent of the plurality of reporting agents to the corresponding collector server of the plurality of collector servers includes:
      grouping the reporting agents in the plurality of reporting agents into a plurality of responsibility groups,
      assigning each collector server of the plurality of collector servers with a sequence number corresponding to one of the responsibility groups in the plurality of responsibility groups,
      wherein each collector server creates an in memory list of reporting agents included the one of the responsibility groups corresponding to the sequence number assigned to the collector server and wherein the in memory list is updated each time one of the reporting agents in the list disconnects from the collector server and each time a new reporting agent connects to the collector server, and
      wherein the monitoring system dynamically splits a workload among the plurality of collector servers by reassigning each reporting agent of the plurality of reporting agents to a new corresponding collector server of the plurality of collector servers when a new collector server is added to the plurality of collector servers and when an existing collector server of the plurality of collector servers is removed from the plurality of collector servers;

receiving, by the plurality of collector servers of the monitoring system, a plurality of metrics from the plurality of reporting agents, the plurality of metrics including health state and performance data for the plurality of applications;

aggregating, by the monitoring system, the plurality of metrics in a shared memory accessible to the plurality of collector servers;

applying, by the monitoring system, one or more rules to the plurality of metrics;

based on the applying of the one or more rules to the plurality of metrics, determining, by the monitoring system, to dispatch one or more alerts and the plurality of metrics to one or more downstream systems of the monitoring system; and dispatching, by the monitoring system, the one or more alerts and the plurality of metrics to the one or more downstream systems utilizing one or more points of access to the one or more downstream systems;

consuming, by the one or more downstream systems of the monitoring system, the plurality of metrics for taking automatic action including scaling of the plurality of applications.

2. The method of claim 1, wherein the monitoring system enables the plurality of reporting agents to each automatically connect to one of the plurality of collector servers by utilizing a configured server address array including service names resolvable through a Domain Name Servers (DNS) system or a Service Discovery system for host configurations associated with the plurality of collector servers.

3. The method of claim 1, wherein the monitoring system directs each of the plurality of collector servers to automatically connect to and poll from the plurality of reporting agents such that a work load is equally balanced between the plurality of collector servers.

4. The method of claim 1, wherein the monitoring system enables the plurality of reporting agents to each automatically connect to the one of the plurality of collector servers without requiring the plurality of reporting agents to be configured.

5. The method of claim 1, wherein the one or more alerts and the plurality of metrics are pulled by the one or more downstream systems utilizing a single point of access to the monitoring system.

6. The method of claim 1, wherein each of the plurality of collector servers pushes the one or more alerts and the plurality of metrics originating from one or more corresponding reporting agents.

7. The method of claim 1, wherein the monitoring system redirects each reporting agent of the plurality of reporting agents to the corresponding collector server of the plurality of collector servers.

8. A computer program product embodied on a non-transitory computer readable medium, comprising computer code for:

assigning, by a monitoring system having a plurality of collectors servers, each reporting agent of a plurality of reporting agents to a corresponding collector server of the plurality of collector servers, wherein each reporting agent of the plurality of reporting agents is embedded in a corresponding one of a plurality of applications of an application system being monitored for overall system health and performance, wherein assigning each reporting agent of the plurality of reporting agents to the corresponding collector server of the plurality of collector servers includes:

grouping the reporting agents in the plurality of reporting agents into a plurality of responsibility groups, assigning each collector server of the plurality of collector servers with a sequence number corresponding to one of the responsibility groups in the plurality of responsibility groups, wherein each collector server creates an in memory list of reporting agents included the one of the responsibility groups corresponding to the sequence number assigned to the collector server and wherein the in memory list is updated each time one of the reporting agents in the list disconnects from the collector server and each time a new reporting agent connects to the collector server, and wherein the monitoring system dynamically splits a workload among the plurality of collector servers by reassigning each reporting agent of the plurality of reporting agents to a new corresponding collector server of the plurality of collector servers when a new collector server is added to the plurality of collector servers and when an existing collector server of the plurality of collector servers is removed from the plurality of collector servers;

receiving, by the plurality of collector servers of the monitoring system, a plurality of metrics from the plurality of reporting agents, the plurality of metrics including health state and performance data for the plurality of applications;

aggregating, by the monitoring system, the plurality of metrics in a shared memory accessible to the plurality of collector servers;

applying, by the monitoring system, one or more rules to the plurality of metrics;

based on the applying of the one or more rules to the plurality of metrics, determining, by the monitoring system, to dispatch one or more alerts and the plurality of metrics to one or more downstream systems of the monitoring system; and dispatching, by the monitoring system, the one or more alerts and the plurality of metrics to the one or more downstream systems utilizing one or more points of access to the one or more downstream systems;

consuming, by the one or more downstream systems of the monitoring system, the plurality of metrics for taking automatic action including scaling of the plurality of applications.

9. The computer program product of claim 8, wherein the monitoring system enables the plurality of reporting agents to each automatically connect to one of the plurality of collector servers by utilizing a configured server address array including service names resolvable through a Domain Name Servers (DNS) system or a Service Discovery system for host configurations associated with the plurality of collector servers.

10. The computer program product of claim 8, wherein the monitoring system directs each of the plurality of collector servers to automatically connect to and poll from the plurality of reporting agents such that a work load is equally balanced between the plurality of collector servers.

11. The computer program product of claim 8, wherein the monitoring system enables the plurality of reporting agents to each automatically connect to the one of the plurality of collector servers without requiring the plurality of reporting agents to be configured.

12. The computer program product of claim 8, wherein the one or more alerts and the plurality of metrics are pulled by the one or more downstream systems utilizing a single point of access to the monitoring system.

13. The computer program product of claim 8, wherein each of the plurality of collector servers pushes the one or more alerts and the plurality of metrics originating from one or more corresponding reporting agents.

14. A monitoring system comprising one or more processors operable for:

assigning, by the monitoring system having a plurality of collectors servers, each reporting agent of a plurality of reporting agents to a corresponding collector server of the plurality of collector servers, wherein each reporting agent of the plurality of reporting agents is embedded in a corresponding one of a plurality of applications of an application system being monitored for overall system health and performance, wherein assigning each reporting agent of the plurality of reporting agents to the corresponding collector server of the plurality of collector servers includes:

grouping the reporting agents in the plurality of reporting agents into a plurality of responsibility groups, assigning each collector server of the plurality of collector servers with a sequence number corresponding to one of the responsibility groups in the plurality of responsibility groups, wherein each collector server creates an in memory list of reporting agents included the one of the responsibility groups corresponding to the sequence number assigned to the collector server and wherein the in memory list is updated each time one of the reporting agents in the list disconnects from the collector server and each time a new reporting agent connects to the collector server, and wherein the monitoring system dynamically splits a workload among the plurality of collector servers by reassigning each reporting agent of the plurality of reporting agents to a new corresponding collector server of the plurality of collector servers when a new collector server is added to the plurality of collector servers and when an existing collector server of the plurality of collector servers is removed from the plurality of collector servers;

receiving, by the plurality of collector servers of the monitoring system, a plurality of metrics from the plurality of reporting agents, the plurality of metrics including health state and performance data for the plurality of applications;

aggregating, by the monitoring system, the plurality of metrics in a shared memory accessible to the plurality of collector servers;

applying, by the monitoring system, one or more rules to the plurality of metrics;

based on the applying of the one or more rules to the plurality of metrics, determining, by the monitoring system, to dispatch one or more alerts and the plurality of metrics to one or more downstream systems of the monitoring system; and dispatching, by the monitoring system, the one or more alerts and the plurality of metrics to the one or more downstream systems utilizing one or more points of access to the one or more downstream systems;

consuming, by the one or more downstream systems of the monitoring system, the plurality of metrics for taking automatic action including scaling of the plurality of applications.

\* \* \* \* \*